C. J. GOGUEN AND J. J. PROVOST.
MICROMETER TAPER GAGE.
APPLICATION FILED JUNE 5, 1920.
1,398,296.
Patented Nov. 29, 1921.
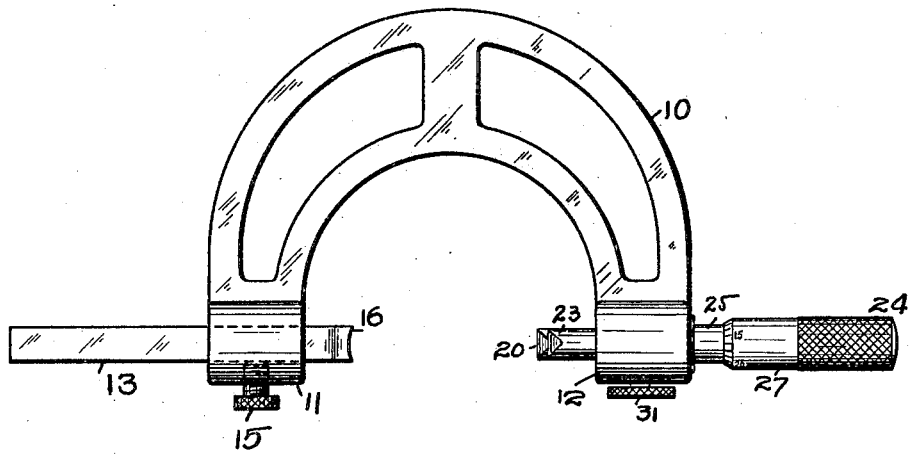
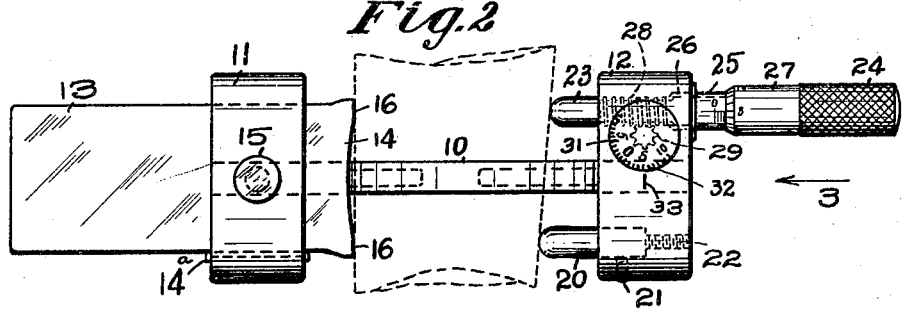
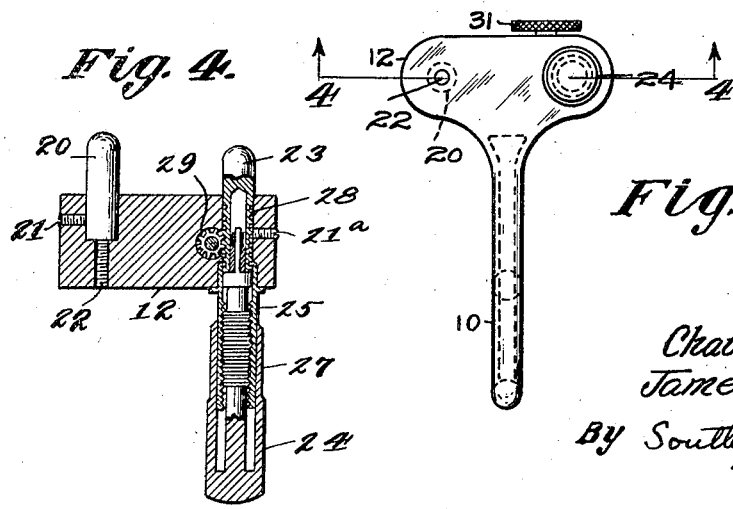
Inventors.
Charles J. Goguen
James J. Provost
By Southgate & Southgate,
Attorneys.

UNITED STATES PATENT OFFICE.

CHARLES J. GOGUEN, OF WORCESTER, AND JAMES J. PROVOST, OF AUBURN, MASSACHUSETTS, ASSIGNORS TO BROWN & SHARPE MANUFACTURING COMPANY, OF PROVIDENCE, RHODE ISLAND, A CORPORATION OF RHODE ISLAND.

MICROMETER TAPER-GAGE.

1,398,296.   Specification of Letters Patent.   Patented Nov. 29, 1921.

Application filed June 5, 1920. Serial No. 386,774.

*To all whom it may concern:*

Be it known that we, CHARLES J. GOGUEN, and JAMES J. PROVOST, both citizens of the United States, the said GOGUEN residing at Worcester, in the county of Worcester and State of Massachusetts, and the said PROVOST residing at Auburn, in the county of Worcester and State of Massachusetts, have invented a new and useful Micrometer Taper-Gage, of which the following is a specification.

This invention relates to a gage for measuring tapers.

The principal objects of the invention are to provide an extremely simple device that will have no complicated mechanism and can be used in the same manner as the ordinary micrometer caliper for measuring the taper of a conical body and showing its amount or degree accurately and conveniently; to provide a device of the above mentioned character with means whereby the taper can be measured by a micrometer device of a well known type; to provide for also measuring the taper in degrees as well in thousandths of an inch per inch in length; and in general to provide a device of this character which will be accurate and reliable and can be employed for small and large bodies without complicated adjustments.

Reference is to be had to the accompanying drawings, in which—

Figure 1 is a side view of an instrument constructed in accordance with this invention;

Fig. 2 is a bottom plan of the same;

Fig. 3 is an end view looking in the direction of the arrow 3 in Fig. 2; and Fig. 4 is a sectional view on the line 4—4 of Fig. 3.

We have shown the invention as mounted on a frame 10, preferably shaped like the bow frame of the ordinary micrometer caliper. This frame is provided with two projections 11 and 12, located opposite each other at its ends and each one widened out as indicated more fully in Fig. 3. The projection 11 constitutes an enlargement with a wide passage extending therethrough in which fits a slide 13 having a rest 14 on its inner end and constituting preferably an integral part of it. The passage through the enlargement 11 constitutes a guide for this slide and keeps it always in alinement, no matter how much it is adjusted. It is shown as provided with a shim 14$^a$ on one side for filling up the space in the guide and assisting in the accuracy with which it is always held in position. For adjustment, it is held in adjusted position by means of a thumb screw 15 or the like.

The operative end of the rest 14 is provided with two widely spaced surfaces 16 at its opposite edges and is concaved between these two surfaces. This construction is provided for the purpose of affording these two surfaces for engagement with one side of the taper to be measured. The centers of these surfaces 16 may conveniently be located an inch apart for a purpose that will be described below.

The other enlargement 12 is of substantially the same shape as the enlargement 11 and has a pair of parallel passages therethrough, also parallel with the slide 13 and directly opposite the two surfaces 16 so that these parts come in the same plane. In one of these passages, is an abutment 20, which in use is intended to be fixed, but it is shown as secured in position by a set screw 21, the end of which enters a longitudinal groove on the abutment. Thus the abutment may be adjusted to take up wear, but in ordinary use, it may be regarded as a positively fixed element and if it were not for wear, could be an integral part of the enlargement 12. A threaded opening 22 is shown by which access to the rear end of it may be had for adjustment of the abutment 20 by means of a screw in the opening (not shown).

The other one of the passages receives the operative end 23 of a micrometer gage 24. This end 23 also constitutes an abutment. It can be made hemispherical on the end but we have shown it at 20 as semicylindrical. This micrometer is made like any micrometer of this type, having a scale graduated to thousandths of an inch preferably, although of course, any other scale could be employed. It will be understood that the tube 25 which constitutes a part of the micrometer is fixed in stationary position in an enlargement 26 in the passage through the member 12, and this tube is provided with a stationary scale, the zero point of which is shown. On the adjusting tube 27, is the usual scale having twenty five divisions around the circumference of each division of the longitudinal scale is a fortieth of an inch. Of course, we are not limited to these particular graduations but this is the one now employed and is on the market and can be used here if desired. As is usual, the micrometer head 27 is hollow and has a central male screw thread inside meshing with an internal thread on the fixed tube 25. The abutment 23 is swiveled at its end to the part having the male thread and moves longitudinally with it when the head 24 is turned.

The turning of the tube 27 moves the abutment 23 back and forth as is well understood in this art. This abutment is prevented from rotating in the head 12 by means of a screw 21ª, similar to the screw 21, entering a longitudinal slot on the abutment. It is provided, however, with screw threads 28 on its external surface which constitute a convenient way of making a rack, but any other kind of a rack can be employed. Meshing with this rack is a pinion 29, on a rotatable shaft. This is provided with a head 31, which is also provided with a scale 32 coöperating with a zero point 33 on the surface of the projection 12. This is an additional scale graduated to register the number of degrees of the taper. In other words, we have shown two scales, one showing the taper in thousandths of an inch per inch, and the other in degrees.

In the use of the device, the slide 13 is set to any convenient position so that the article to be measured, if set against the abutment 20 on one side will engage the two surfaces 16 on the opposite side, and then the micrometer is operated to bring it into contact with the tapered article when the taper will be readable directly on the micrometer or on the circular scale.

It will be understood that either of these or both can be employed. It will also be understood that the zero point is so placed that the micrometer will read zero when the two abutments 20 and 23 are in a line parallel with the plane of the surfaces 16. This can be tested at any time by putting in a cylindrical object or a rectangular one for test purposes.

It is also to be understood that preferably the centers of the two abutments 20 and 23 are exactly an inch apart and this is the reason for placing the two surfaces 16 at the same distance, but of course, if a different distance is chosen, the scales will be calibrated accordingly.

In view of the above, it will be seen that this instrument is extremely simple; has no projecting parts that are not familiar to mechanics in general; is of such a nature that anyone used to micrometer calipers can use it conveniently with very little or no explanation; is capable of measuring tapers to any degree of fineness desired; and is inexpensive to make and calibrate.

Although we have illustrated and described only one form of the invention and shown certain details of construction, including two scales, we are aware of the fact that modifications can be made therein without departing from the scope of the invention as expressed in the claims. Therefore we do not wish to be limited to the two scales or to the other details of construction, except as expressed in the claims, but what we do claim is:

1. In a taper gage, the combination with a supporting frame, of a rest adjustable as a whole thereon having two separated surfaces in the same transverse plane for engagement with one side of the tapered work to be measured, and two abutments located opposite, and in the same plane as said rest for engagement with the opposite side of the work, one of them being adjustable independently of the other.

2. In a taper gage, the combination with a supporting frame, of a rest thereon, said rest having two fixed surfaces spaced at a constant distance apart and with their operative surfaces in the same plane for engagement with one side of the tapered work to be measured, and two abutments, each located opposite one of said surfaces and substantially at the same constant distance apart and in the same plane as said rest.

3. In a taper gage, the combination with a supporting frame, of means thereon for engagement with one side of the tapered work to be measured, and two abutments located opposite said means and spaced equally on opposite sides of the center thereof for engagement with the opposite side of the work, one of them being adjustable and the other one being fixed, said abutments and engaging means being in the same plane.

4. In a taper gage, the combination with a frame, of means thereon for engagement with one side of the tapered work to be measured, and two abutments located opposite said means in the same plane for simultaneous engagement with the opposite side of the work, one of them being adjustable, a rack on the adjustable abutment, a pinion meshing with said rack and adapted to be rotated thereby as the abutment is adjusted, and a rotatable scale connected with the pinion for showing the extent of motion of the abutment.

5. In a taper gage, the combination with a supporting frame, of means thereon for engagement at two separated points with one side of the tapered work to be measured, and two abutments located opposite said means and in the same plane for engagement with the opposite side of the work, one of them being adjustable and the other one being fixed, said adjustable abutment having a rack thereon and a rotatable scale provided with a pinion meshing with said rack and adapted to be rotated thereby as the abutment is adjusted, said scale being calibrated to show the taper.

6. In a taper gage, the combination with a supporting frame, of a rest thereon for engagement with one side of the tapered work to be measured, two abutments located opposite said rest and in the same plane for engagement with the opposite side of the work, one of them being adjustable, a graduated scale, and connections between said adjustable abutment and the scale for showing directly on the scale the amount of taper.

In testimony whereof we have hereunto affixed our signatures.

CHARLES J. GOGUEN.
JAMES J. PROVOST.